US010356396B2

(12) United States Patent
Juni

(10) Patent No.: US 10,356,396 B2
(45) Date of Patent: Jul. 16, 2019

(54) EXHIBITION DEVICE AND VIDEO PICTURE EXHIBITION METHOD

(71) Applicant: NITTO DENKO CORPORATION, Ibaraki-shi, Osaka (JP)

(72) Inventor: Noriyuki Juni, Ibaraki (JP)

(73) Assignee: NITTO DENKO CORPORATION, Ibaraki-shi (JP)

(*) Notice: Subject to any disclaimer, the term of this patent is extended or adjusted under 35 U.S.C. 154(b) by 0 days.

(21) Appl. No.: 15/540,389

(22) PCT Filed: Nov. 20, 2015

(86) PCT No.: PCT/JP2015/082649
§ 371 (c)(1),
(2) Date: Jun. 28, 2017

(87) PCT Pub. No.: WO2016/111092
PCT Pub. Date: Jul. 14, 2016

(65) Prior Publication Data
US 2018/0003997 A1    Jan. 4, 2018

(30) Foreign Application Priority Data

Jan. 8, 2015 (JP) ................................. 2015-002407

(51) Int. Cl.
*H04N 13/363* (2018.01)
*H04N 13/302* (2018.01)
(Continued)

(52) U.S. Cl.
CPC ............. *H04N 13/302* (2018.05); *G02B 5/09* (2013.01); *G02B 27/22* (2013.01);
(Continued)

(58) Field of Classification Search
CPC ............................ G09F 19/16; G03B 21/606
(Continued)

(56) References Cited

U.S. PATENT DOCUMENTS 2,952,182 A * 9/1960 Fassoulis ............... G03B 21/60
352/86
8,540,371 B2 * 9/2013 Sugiyama .............. G03B 21/28
353/10
(Continued)

FOREIGN PATENT DOCUMENTS

JP         5-249428 A      9/1993
JP      2009-49007 A      3/2009
(Continued)

OTHER PUBLICATIONS

International Search Report dated Jan. 26, 2016, issued in counterpart International Application No. PCT/JP2015/082649 (2 pages).
(Continued)

*Primary Examiner* — Christopher E Mahoney
(74) *Attorney, Agent, or Firm* — Westerman, Hattori, Daniels & Adrian, LLP

(57) ABSTRACT

Art exhibition device and a video picture exhibition method which are capable of providing renditions by a spatial image and a projected image, in combination are provided. The exhibition device includes a display portion configured to image-form a spatial image; and a projector configured to project a video picture onto an object. The video picture exhibit ion method using the exhibition device provides a video picture related to the spatial image projected from the projector disposed in a position hang over the display portion toward an upper surface of the display portion. The display portion is configured to image-form a video picture displayed on a display surface of a display disposed in an attitude inclined under a micromirror array through the micromirror array disposed in light-transmissive fashion as a spatial two-dimensional video picture standing up obliquely in a spatial position lying over the micromirror array.

6 Claims, 5 Drawing Sheets

(51) Int. Cl.
*H04N 5/64* (2006.01)
*G02B 27/22* (2018.01)
*G09F 19/18* (2006.01)
*G02B 5/09* (2006.01)
*G09F 19/16* (2006.01)
*H04N 13/365* (2018.01)

(52) U.S. Cl.
CPC ..... *G02B 27/2214* (2013.01); *G02B 27/2228* (2013.01); *G09F 19/16* (2013.01); *G09F 19/18* (2013.01); *H04N 5/64* (2013.01); *H04N 13/363* (2018.05); *H04N 13/365* (2018.05)

(58) Field of Classification Search
USPC ..................................................... 353/10, 28
See application file for complete search history.

(56) References Cited

U.S. PATENT DOCUMENTS

| | | | | |
|---|---|---|---|---|
| 9,910,409 | B2* | 3/2018 | Juni | ............ G09F 19/18 |
| 9,989,775 | B2* | 6/2018 | Crowder | ............ G02B 27/2292 |
| 2009/0213331 | A1 | 8/2009 | O'Connell et al. | |
| 2010/0231694 | A1 | 9/2010 | Kawamura | |
| 2011/0181837 | A1* | 7/2011 | O'Connell | ......... G02B 27/2292 353/10 |
| 2011/0285964 | A1* | 11/2011 | Reichow | ............ G03B 21/608 353/10 |
| 2015/0124222 | A1 | 5/2015 | Juni | |
| 2016/0116886 | A1 | 4/2016 | Juni | |

FOREIGN PATENT DOCUMENTS

| | | | |
|---|---|---|---|
| JP | 2009-521005 A | 5/2009 | |
| JP | 2014-115606 A | 6/2014 | |
| JP | 2014-126682 A | 7/2014 | |
| JP | 2014-238492 A | 12/2014 | |
| JP | 2014-238493 A | 12/2014 | |
| JP | WO 2014196356 A1 * | 12/2014 | ............ G09F 19/18 |

OTHER PUBLICATIONS

Notification of Transmittal of Translation of the International Preliminary Report on Patentability (Form PCT/IB/338) issued in counterpart International Application No. PCT/JP2015/082649 dated Jul. 20, 2017, with Forms PCT/IB/373 and PCT/ISA/237. (7 pages).

Office Action dated Aug. 28, 2018, issued in counterpart Japanese Application 2015-002407, with English machine translation. (3 pages).

Office Action dated Mar. 26, 2019, issued in counterpart JP Application No. 2015-002407, with English machine translation. (5 pages).

* cited by examiner

Related Art

EXHIBITION DEVICE AND VIDEO PICTURE EXHIBITION METHOD

TECHNICAL FIELD

The present invention relates to an exhibition device and a video picture exhibition method which are capable of displaying a spatial two-dimensional video picture having a sense of depth in a manner floating up over an enclosure.

BACKGROUND ART

The present applicant has already proposed a display device in which a panel-shaped image-forming optical element and a display of a flat panel type are used to image-form a projected image of a video picture (such as a moving picture and a still picture) displayed on a display surface of the aforementioned display as a spatial two-dimensional video picture floating up in space over the image-forming optical element (see PTL 1).

As shown in FIG. 5, the aforementioned display device principally includes an image-forming optical element (micromirror array M) having an image-forming function, a flat panel display (display D) for displaying video pictures, and a case C or an open type housing for housing the image-forming optical element and the flat panel display. The micromirror array M is mounted in light-transmissive fashion in an opening provided in an upper surface (top plate portion) of the case C.

The display D is provided under the micromirror array M, and is supported by a mounting stand F, with a display surface Da of the display D inclined at a predetermined angle α (not less than 30 degrees and less than 90 degrees) with respect to a lower surface Mb of the micromirror array M. A video picture I (emitted light indicated by dash-double-dot lines) displayed on the display surface Da of the display D is image-formed through the micromirror array M as a two-dimensional video picture (spatial image I') standing up obliquely in space over the micromirror array M (over an upper surface Ma) at a position symmetrical thereto with respect to the array M.

RELATED ART DOCUMENT

Patent Document

PTL 1: JP-A-2014-115606

SUMMARY OF INVENTION

In the display device as mentioned above, a spatial two-dimensional video picture (spatial image) floats up over the enclosure of the device. Thus, the display device as mentioned above gives stronger impression and impact than conventional display devices such as LCDs, PDPs and organic EL devices when in personal use in the home and the like. In the light of advertisements and exhibition (digital signage) in storefronts, shows and the like and commercial use in presentations and the like, improvements in impact and in eye-catching effect are, however, required for the display device as mentioned above because video pictures are exhibited, for example, in large space.

Also, an exhibition device (video picture exhibition device) for use in the fields of advertisements and exhibition in storefronts and display and sales of merchandise and the like is considered to have improved advertising effectiveness, if display (spatial image) is exhibited together with actual commodities (goods or exhibition objects) for cooperated appeals, rather than being used alone, as the aforementioned advertisements. The conventional display device and the conventional exhibition device still have room for improvement in these regards.

In view of the foregoing, it is therefore an object of the present invention to provide an exhibition device and a video picture exhibition method which are capable of providing impressive and effective renditions by using two images, i.e. a spatial image and a projected image, in combination.

To accomplish the aforementioned object, a first aspect of the present invention is intended for an exhibition device comprising: a display portion configured to image-form a video picture in space and to be described below; and a projection portion configured to project a video picture onto an object, wherein the display portion is positioned in a predetermined position, and wherein the projection portion is disposed in a position lying over the upper surface of an enclosure of the display portion, and is positioned so as to be able to project a predetermined video picture onto a region of the upper surface of the enclosure around a spatial two-dimensional video picture image-formed by the display portion.

The display portion includes a display, an image-forming optical element, and the enclosure configured to house the display and the image-forming optical element; and is configured to image-form a video picture displayed on a display surface of the display disposed in an attitude inclined at a predetermined angle under the image-forming optical element disposed in light-transmissive fashion in an upper surface of the enclosure as a spatial two-dimensional video picture standing up obliquely in a spatial position lying over the upper surface of the enclosure through the image-forming optical element.

A second aspect of the present invention is intended for a method of exhibiting a video picture by use of an exhibition device. The method comprises image-forming a video picture in space using the display portion above; and projecting a video picture onto an object using a projection portion, wherein a predetermined video picture different from a spatial two-dimensional video picture image-formed by the display portion is projected from the projection portion disposed in a position lying over the display portion toward the upper surface of the enclosure of the display portion positioned in a predetermined position.

Specifically, the present inventor has made studies to solve the aforementioned problem. As a result, the present inventor has found that the advertising effectiveness (impact and eye-catching effect) of the exhibition of the video picture is dramatically improved by projecting another video picture related to a spatial image from the projector onto at least a portion around the spatial image (spatial two-dimensional video picture) projected by the display portion and bringing the spatial image and the related video picture into operative association with each other. Thus, the present inventor has attained the present invention. Also, the present inventor has found that more impressive and more effective renditions are achieved with an increased sense of depth (pseudo-three-dimensional effect) of the spatial image by placing a three-dimensional object (exhibiting object) causing binocular parallax between the spatial image and the three-dimensional object in a region (upper surface of the enclosure of the display portion) which lies around the spatial image and onto which the related video picture is to be projected and by projecting the related video picture onto the surface of the three-dimensional object.

The exhibition device according to the present invention includes: the display portion configured to image-form a video picture displayed on the display as a spatial two-dimensional video picture standing up obliquely in a spatial position lying over the image-forming optical element; and the projection portion configured to project a video picture onto an object. The display portion is positioned in a predetermined position. The projection portion is disposed in a position lying over the upper surface of the enclosure of the display portion, and is positioned so as to be able to project a predetermined video picture related to a spatial two-dimensional video picture onto the upper surface of the enclosure around the spatial two-dimensional video picture projected by the display portion. Thus, the exhibition device according to the present invention is capable of displaying the spatial two-dimensional video picture (i.e., video picture displayed on the display) over the display portion as a spatial image the presence of which is more accentuated and which is rich in a sense of depth and in a sense of realism in contrast with the video picture projected around the two-dimensional video picture.

That is, the exhibition device achieves the exhibition which gives stronger impact to a viewer and which produces a high eye-catching effect, with the spatial image and the projected video picture combined together. In advertisements and exhibition and for commercial use in presentations and the like, the exhibition device also achieves the intended exhibition with especially impressive and effective renditions.

In particular, the exhibition device according to the present invention in which the image-forming optical element of the display portion is disposed in an opening provided in the upper surface of the enclosure and in which an exhibiting object having a predetermined three-dimensional shape is disposed in a region of the upper surface of the enclosure around the opening causes large binocular parallax between the exhibiting object and the spatial image. This achieves further improvements in the sense of depth and the sense of realism of the spatial image.

In particular, the exhibition device according to the present invention in which at least one of the display portion and the projection portion includes a video picture synchronizer configured to control the display of a spatial two-dimensional video picture by the display portion and the projection of a video picture onto the upper surface of the enclosure by the projection portion in operative association with each other is capable of exhibiting the spatial two-dimensional video picture and the projected video picture in operative association with each other with a sense of unity. This achieves the aforementioned exhibition with more impressive and more effective renditions.

Next, the method of exhibiting a video picture by use of an exhibition device according to the present invention includes: image-forming a video picture displayed on the display as a spatial two-dimensional video picture standing up obliquely in a spatial position lying over the image-forming optical element using the display portion; and projecting a video picture onto an object using the projection portion, wherein a predetermined video picture different from a spatial two-dimensional video picture image-formed by the display portion is projected from the projection portion disposed in a position lying over the display portion toward the upper surface of the enclosure of the display portion positioned in a predetermined position. This video picture exhibition method achieves the exhibition which gives stronger impact to a viewer and which produces a high eye-catching effect, with the spatial image and the projected video picture combined together. Also, the video picture exhibition method achieves the exhibition with more impressive and more effective renditions.

In the case of the video picture exhibition method according to the present invention in which the image-forming optical element of the display portion is disposed in an opening provided in the upper surface of the enclosure, in which an exhibiting object having a predetermined three-dimensional shape is disposed in a region of the upper surface of the enclosure around the opening, and in which the projection portion projects a video picture corresponding to the three-dimensional shape onto a surface of the exhibiting object, binocular parallax is caused between the exhibiting object and the spatial image. This achieves further improvements in the sense of depth and the sense of realism of the spatial image.

Further, in the case of the video picture exhibition method according to the present invention in which the display of a spatial two-dimensional video picture by the display portion and the projection of a video picture onto the upper surface of the enclosure by the projection portion are performed in synchronism with each other, the spatial two-dimensional video picture and the projected video picture are exhibited in operative association with each other with a sense of unity. This achieves the aforementioned exhibition with more impressive and more effective renditions.

DESCRIPTION OF EMBODIMENTS

Next, an embodiment according to the present invention will now be described in detail with reference to the drawings. It should be noted that the present invention is not limited to this embodiment.

Figure 1:
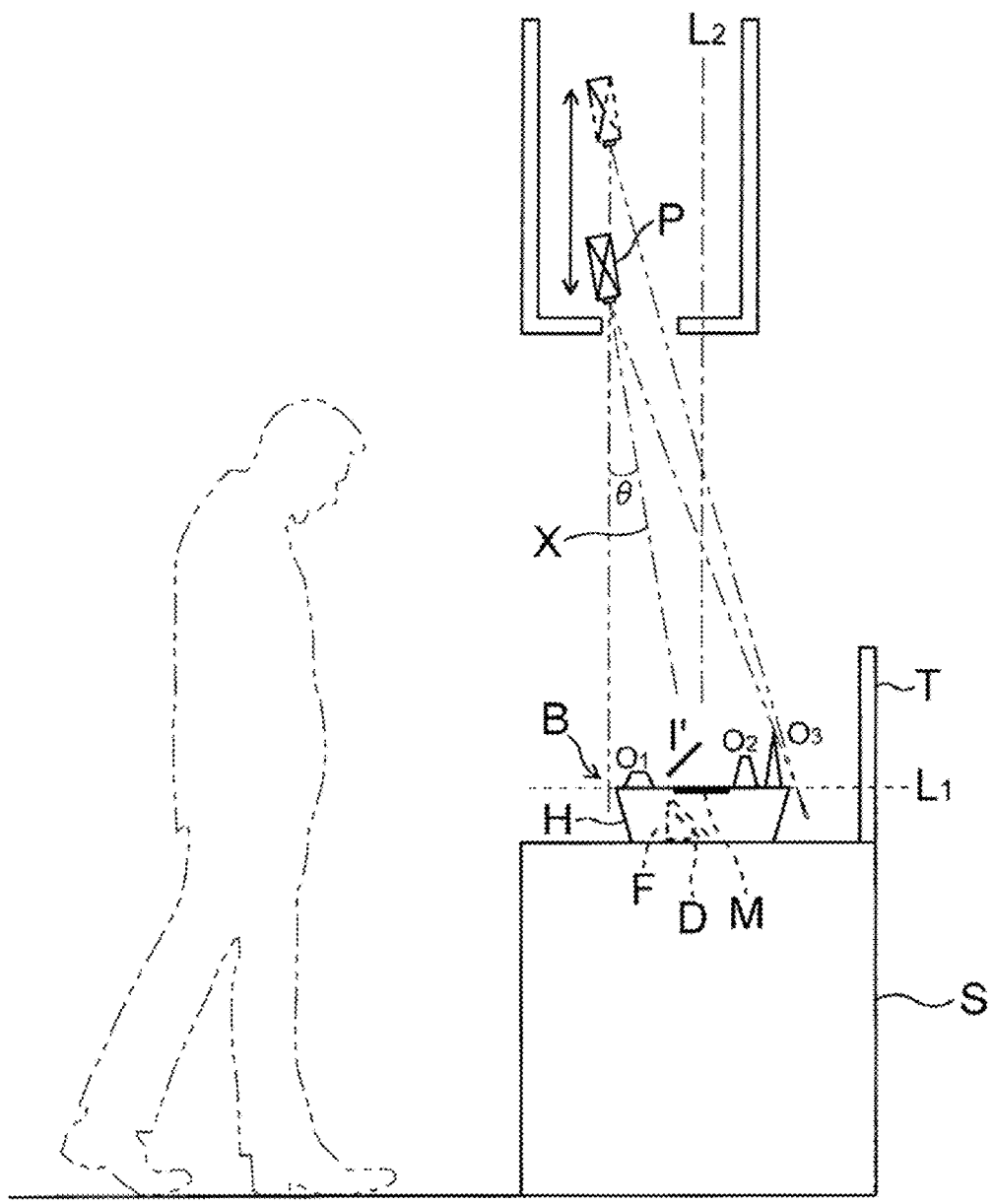
FIG. 1 is an illustration showing a video picture exhibition method according to an embodiment of the present invention.
Figure 2:
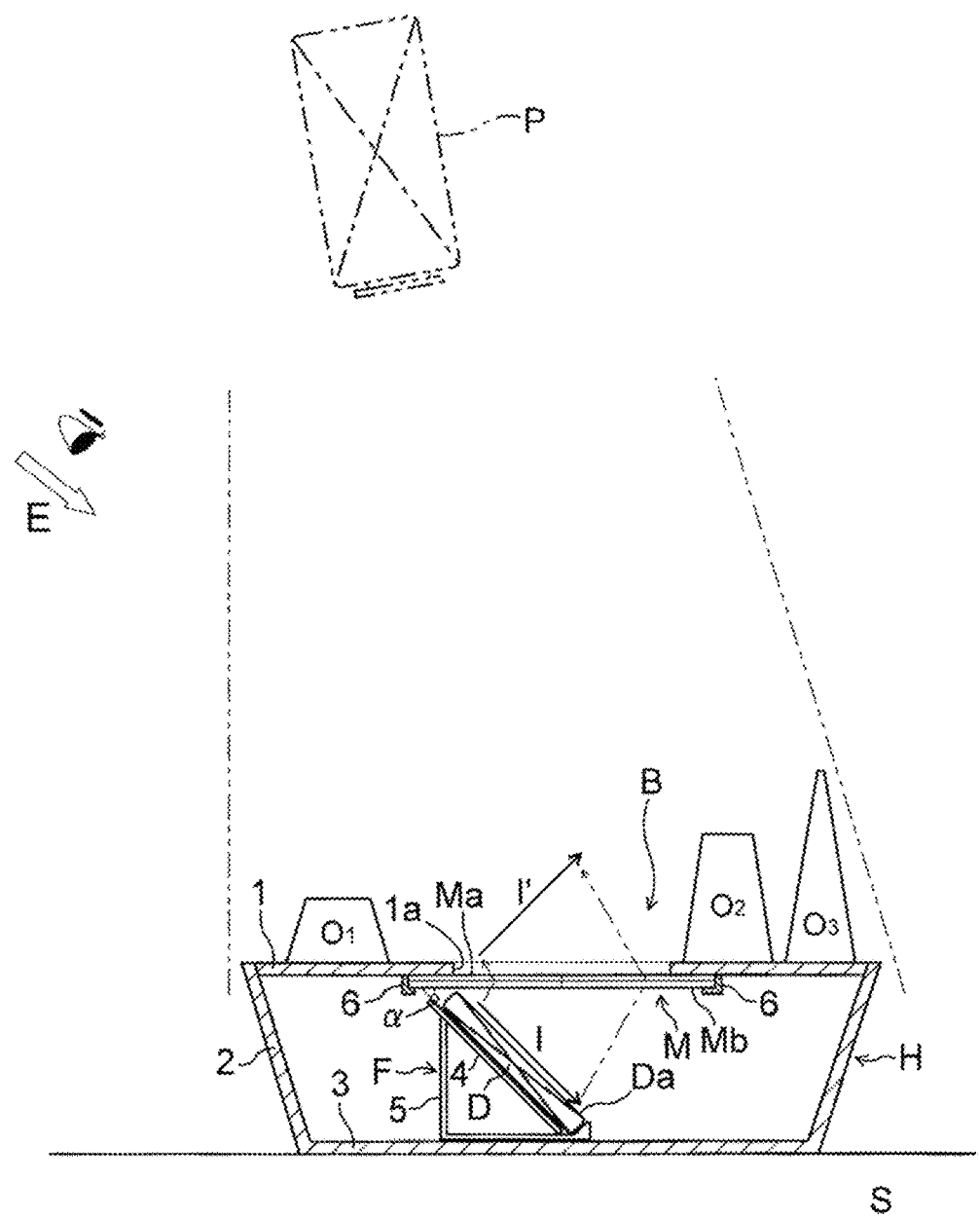
FIG. 2 is a sectional view showing a structure of an exhibition device according to the embodiment of the present invention.

FIG. 1 is an illustration showing a video picture exhibition method using an exhibition device according to the present invention. FIG. 2 is a sectional view showing a structure of the exhibition device according to the embodiment of the present invention. In each figure, part of an enclosure such as a case and a housing, and components such as interconnect lines and electrical components are not shown for the purpose of briefly illustrating only the structure of principal parts of the exhibition device of the present invention. For ease of understanding, the thicknesses of a "video picture I" displayed on a display surface Da of a display D and a "spatial image I'" obtained by projecting the video picture I are shown in exaggeration. Exiting light (light beams) is indicated by dash-double-dot lines.

As shown in FIG. 1, video pictures are exhibited according to the present embodiment by the use of the exhibition device including: a display portion B placed on an exhibition surface present in an upper surface of an exhibition table S or the like; and a projector P that is a projection portion configured to project video pictures. That is, the video picture exhibition method according to the embodiment is an exhibition method in which, with a spatial two-dimensional video picture (spatial image I') projected and image-formed in space over the display portion B, a video picture (light beams indicated by dash-double-dot lines) different from the video picture (spatial image I') displayed by the display portion B and related to the spatial image I' is projected from the projector P provided over the display portion B toward an upper surface of the display portion B. This allows the aforementioned spatial image I' to be displayed as a spatial image rich in a sense of depth and in a sense of realism.

In the figures, the reference character D designates a flat panel display (display); M designates an image-forming optical element (micromirror array); F designates a mounting stand for the display D; H designates an enclosure (housing) for housing the flat panel display D, the image-forming optical element M and the mounting stand F; and $O_1$, $O_2$ and $O_3$ designate a group of objects (generically referred to as "objects O") placed on an upper surface of the housing H.

The exhibition device used for the aforementioned video picture exhibition method will be described in detail. As shown in sectional view in FIG. 2, the display portion B placed on the exhibition table S or the like includes: the panel-shaped micromirror array image-forming optical element (hereinafter referred to as a "micromirror array M" or simply as an "array M"); the flat panel display (hereinafter referred to as a "display D") such as an LCD; the display mounting stand F for supporting this display D in an obliquely inclined attitude under the array M (inside the housing H); and the housing H or the like for housing the array M, the display D and the mounting stand F. A hollow arrow E indicates the line of sight of a person (viewer) viewing this display portion B.

The housing H constituting the display portion B includes: a closed-bottomed cylindrical housing body including a disk-shaped bottom portion 3 and a side portion 2 provided so as to surround the bottom portion 3; and a cover (top plate portion 1, with reference to FIG. 3) for covering an opening in an upper surface of the housing body with a lid. The top plate portion 1 has a circular opening 1a (circular hole) disposed centrally thereof. The micromirror array M is mounted to the underside (inside) of the opening 1a through the use of mounting members 6, as shown in FIG. 2.

The display mounting stand F for fixing (placing) the display D thereon is disposed inside the housing H. This display mounting stand F includes a plate-like member 4 for placing the display D thereon, and a frame 5 or the like for supporting this plate-like member 4, and is placed on the bottom portion 3 of the housing H. The plate-like member 4 inclined at a predetermined angle α with respect to the bottom portion 3 (inner bottom surface of the housing) of the housing H and a lower surface Mb of the micromirror array M is supported and fixed by the frame 5 or the like. The plate-like member 4 has an upper surface serving as a mounting surface for the display D.

A device having an LCD screen, such as a smartphone, is placed on the mounting surface for the display D, so that the display surface Da of the display D provided in this device is held in an attitude inclined at the predetermined angle α with respect to the lower surface Mb of the micromirror array M. The inclination angle α of the display mounting stand F inside the housing H with respect to the lower surface Mb of the micromirror array M is adjusted so that the array M achieves optimum image formation, and is generally in the range of 30 degrees to less than 90 degrees, and preferably in the range of 40 degrees to 80 degrees.

Desirable examples of the display D placed on the display mounting stand F and used for displaying the video picture I include display panels capable of reproducing "white" as balanced as possible over all visible wavelengths and "black" when in a non-display state with good contrast, such as plasma display panels and organic EL display panels, in addition to liquid crystal display panels (LCDs) with backlights.

The display D may be a display portion of a cellular mobile phone, a personal digital assistant or the like. Specifically, such a display portion having a normally exposed (uncovered) type display surface Da for smartphones, tablets, tablet PCs, digital photo frames, portable game machines, portable book readers, PDAs, electronic dictionaries and the like in which the dimensions of the display surface Da thereof correspond to the size (planar shape) of the micromirror array M may be used as the display D. The display D used for the display portion B according to the present invention includes a video picture synchronizer (part of a program for controlling a receiver which receives a synchronization signal and the reproduction of video pictures) which controls the display (projection of the spatial image I') on the display D and the projection of a video picture onto the upper surface of the housing H by means of the projector P to be described later in operative association with each other.

Figure 4A:
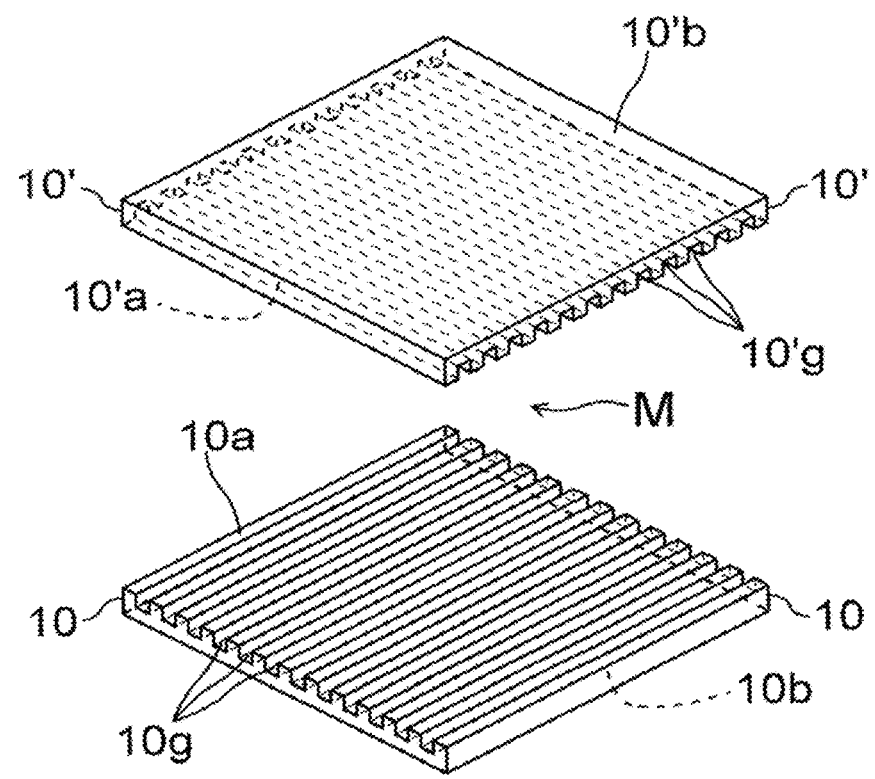
FIG. 4A is an exploded perspective view illustrating a configuration of a micromirror array used for the display portion of the exhibition device according to the present invention.
Figure 4B:
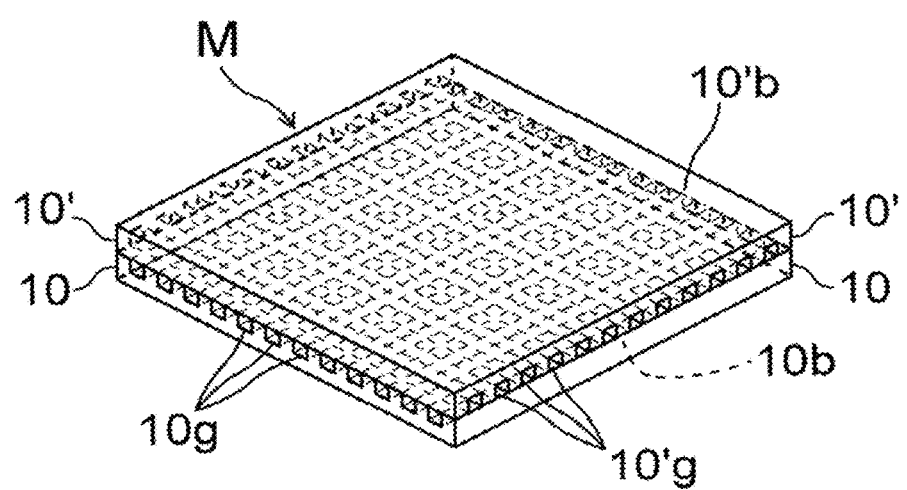
FIG. 4B is an external perspective view thereof after assembly.

Examples of the image-forming optical element (micromirror array M) disposed under (on the back surface side of) the opening 1a of the top plate portion 1 of the housing H and used for projecting (image-forming) the video picture I displayed on the display D include refraction type image-forming elements such as various lenses including Fresnel lenses and the like, micromirrors of afocal optical systems, and corner reflectors. Of these, the micromirror array M (corner reflector array comprised of two optical elements) which forms an image at a symmetrical position with respect to the upper surface of the housing H, as shown in FIGS. 4A and 4B, is preferably used in the embodiment of the present invention. This micromirror array M is disposed substantially horizontally with respect to the eyepoint of the viewer by means of the arbitrary mounting members 6 (with reference to FIG. 2) or the like.

Multiple exhibiting objects (objects O including $O_1$, $O_2$, $O_3$, . . . and the like shown in FIG. 2) for reinforcing the sense of depth and the sense of realism of the spatial image I' are placed around the opening 1a of the top plate portion 1 except the opening 1a on the upper surface of the housing H (upper surface of the top plate portion 1) of the display portion B according to the present embodiment. The projector P for projecting a video picture related to the spatial image I' toward the objects O (group of objects) is disposed in upwardly spaced-apart relation to the top plate portion 1 of the housing H (with reference to FIG. 1).

Figure 3:
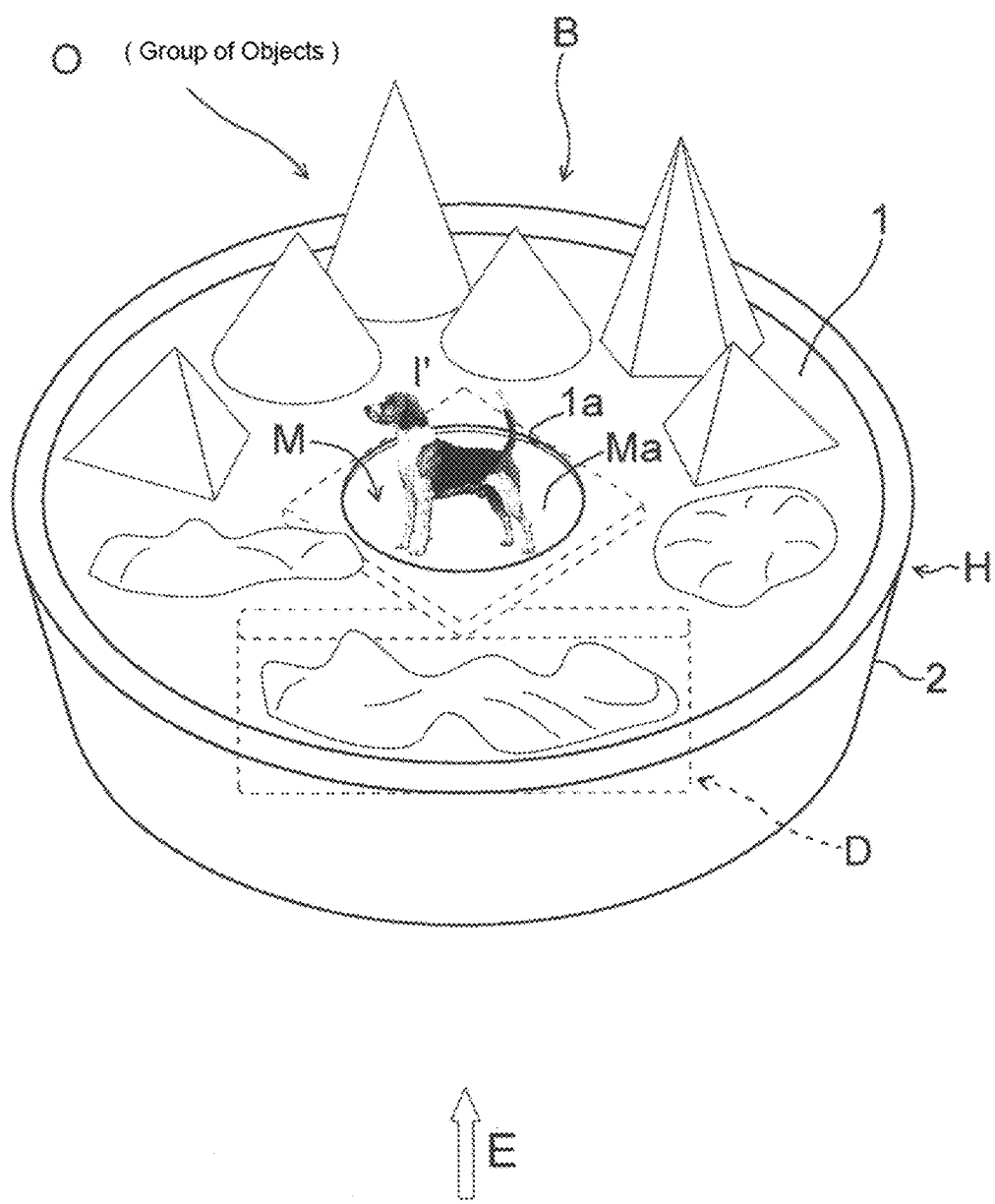
FIG. 3 is an external perspective view of a display portion in the exhibition device.

Each of the objects $O_1$, $O_2$, $O_3$, . . . and the like placed on the upper surface of the housing H is not particularly limited in its three-dimensional shape (surface shape) so long as each object has a surface color capable of reflecting the light of a video picture projected from the projector P except dark colors such as black. The objects $O_1$, $O_2$, $O_3$, . . . and the like having any shape may be used. In consideration of the projection of video pictures by means of the projector P from above as mentioned above, there is however apprehension that shadows produced on the surfaces of the exhibiting objects by the projected light become an impediment to the representation of the video pictures. Examples of preferable shapes of the objects $O_1$, $O_2$, $O_3$ and the like according to the present invention include: cones and pyramids (polygonal pyramids) disposed on the far side; gently sloping shapes such as the shapes of mountains and hills disposed on the near side; and shapes less prone to produce shadows when receiving light from the projector P lying thereover such as the shapes of ponds and lakes which are recessed, as shown in FIG. 3. It is desirable that the objects $O_1$, $O_2$, $O_3$ and the like according to the present invention have at least a shape and a color (white, pale colors and the like, if possible) which do not produce shadows resulting from the light projected from the projector P as seen from the viewer side (near side). If required, a "shadow" may be produced and presented intentionally by projection as a dark or black portion on a video picture.

Plastic models imitating trees, woods and the like, figures imitating minicars, candy toys, animals and plants, and the like may be disposed on the top plate portion 1 of the housing H as the objects placed on the upper surface in addition to the solid model as mentioned above to constitute a diorama on the top plate portion 1. For commercial use, exhibition and display may be further performed using specific characters, merchandise, merchandise models and the like on the top plate portion 1.

Next, as shown in FIG. 1, the projection portion (projector P) for projecting a video picture onto the upper surface of the display portion B is disposed movably up and down in a position lying over the position of the upper surface of the display portion B (upper surface of the top plate portion 1; indicated by a horizontal line $L_1$ in the figure) and on the front side (near side of the viewer; left-hand side in the figure) of the opening 1a of the display portion B (the display position of the spatial image I'; indicated by a vertical line $L_2$ in the figure).

In this manner, the projector P is disposed in the aforementioned position, and a video picture is projected from the aforementioned position toward the exhibiting objects (objects O) placed on the top plate portion 1, with the projection light axis (indicated by a dash-and-dot line X) of the projector P inclined toward the far side of the display portion B (in this case, at an angle θ of approximately 5 to 45 degrees with respect to the vertical line $L_2$). This prevents shadows from being produced on the surfaces of the exhibiting objects by the projected light. Also, the shadows of these objects O themselves extending toward the far side are difficult to see by the viewer. The projector P is generally disposed at a height (height from a floor surface) on the order of 190 to 300 cm, and preferably in the range of 200 to 250 cm, in consideration of the height of a person, the height of a ceiling and the like.

Like the display D, this projector P includes part of a program and the like for controlling a receiver which receives a synchronization signal, a light source and the projection (shutter) as a video picture synchronizer capable of projecting video pictures in operative association with and in synchronism with the display on the display D. A halogen lamp, an LED and the like may be used as the light source of the projector P (built-in). The vertical position of the projector P is adjusted by an elevating mechanism so that the projection range is approximately equal in size to the upper surface of the top plate portion 1 or does not extend off the upper surface.

A video picture for projection from the projector P is supplied from a built-in recording medium, an external reproduction device or the like, and includes a black image (that is, no light is projected onto that portion) in a position corresponding to the opening 1a of the top plate portion 1 for purposes of avoiding interference with the spatial image I' projected from the display portion B and displaying the spatial image I' clearly.

Black or darkly colored materials or coatings, for example, are used for the upper surface (around the display portion B) of the exhibition table S on which the display portion B is placed and for the surfaces of a screen T, a wall (wall surface) and the like provided upright around the far side and the like so that a video picture extending off the upper surface of the top plate portion 1 is less prone to be seen by the viewer and so that the spatial image I' and the projected image are easily visually recognizable.

Next, the micromirror array M for use in the exhibition device according to the aforementioned embodiment will be described.

As shown in FIG. 4A, the micromirror array M having the image-forming function includes two optical elements (upper and lower unitary optical elements shown in FIG. 4A) each having a plurality of parallel linear grooves arranged at predetermined spacings and formed in a surface of a transparent substrate made of acrylic, glass or the like by dicing using a rotary blade. The two optical elements are stacked together in such a manner that the "front surfaces" of the respective optical elements where the linear grooves are formed are brought into abutment with each other so that the longitudinal directions of the linear grooves of the respective optical elements are orthogonal to each other as seen in plan view, to thereby constitute a single unit (with reference to FIG. 4B).

The structure of the micromirror array M will be described in further detail. The micromirror array M shown in FIG. 4B is formed by stacking the optical elements (10 and 10') shown in FIG. 4A together. Substrates 10 and 10' (substrates prior to the formation of grooves 10g and 10'g) constituting the respective optical elements are base bodies for engraving of the linear grooves 10g and 10'g, and are made of a material having a visible light transmittance of not less than 80%, such as glass and acrylic resin, for example.

These substrates 10 and 10' are generally in the form of hard plates having a fixed thickness (thickness on the order of 0.5 to 10.0 mm). The upper surfaces (front surfaces 10a and 10'a) of the respective substrates 10 and 10' are engraved with the linear grooves 10g and 10'g by dicing. Substrate surface portions which lie between adjacent ones of the linear grooves 10g and 10'g and which are not engraved with the grooves are ridge portions protruding toward one surface of each of the substrates 10 and 10' by the formation of the adjacent grooves. Flat areas to which the engraving of the grooves 10g and 10'g does not extend are support bases for the aforementioned ridge portions formed unengraved between the grooves 10g and 10'g.

The grooves 10g and 10'g in the substrates 10 and 10' are formed using a rotary blade (cutting) of a dicing machine and the like, and are spaced at predetermined intervals (spacings) in one direction in surfaces to be machined (front surfaces) of the substrates 10 and 10' so as to be parallel to each other. Side surfaces (wall surfaces) constituting these grooves 10g and 10'g, which are formed by dicing using the aforementioned rotary blade, are formed as light-reflective vertical surfaces (mirror surfaces).

Depending on the thickness of a dicing blade (total thickness between end surfaces of the rotary blade), the grooves 10g and 10'g obtained by engraving using the dicing blade have a groove width of approximately 20 to 350 µm and a groove depth of approximately 50 to 500 μm, when the blade having a thickness on the order of 0.015 mm (15 μm) to 0.3 mm (300 μm) is in general used. The remaining regions (ridge portions) where these grooves 10g and 10'g are not formed are in the form of parallel ribs having a width of approximately 50 to 300 μm and a height of approximately 50 to 500 μm (the same as the depth of the grooves).

With the first substrate 10' rotated 90 degrees horizontally relative to the second lower substrate 10 (that is, with a phase difference of 90 degrees between the directions of extension of the "grooves" in the lower substrate 10 and the upper substrate 10'), the two substrates 10 and 10' in which the respective linear grooves 10g and 10'g are formed are stacked together to form the micromirror array M, as shown in FIG. 4B.

There is a phase difference of 90 degrees between the directions of the grooves in the lower substrate 10 and the upper substrate 10' as mentioned above when the two substrates 10 and 10' are stacked together. Thus, the continuous directions of the grooves 10g and 10'g of the respective substrates 10 and 10' formed in the same shape are disposed in orthogonal relation to each other as seen in plan view (three-dimensionally in "skew" relation). When the micromirror array M is seen in the direction of the front and back of the substrates (vertical direction) in this state, the grooves 10'g of the upper substrate 10' and the grooves 10g of the lower substrate 10 are orthogonal to each other in the form of a lattice as seen in plan view. A corner reflector (a corner reflector with two vertically spaced surfaces) is formed at each of the intersections of the grooves 10g and 10'g. Such a corner reflector includes a light-reflective vertical surface (second mirror surface) of each of the grooves 10'g of the upper substrate 10' and a light-reflective vertical surface (first mirror surface) of each of the grooves 10g of the lower substrate 10.

Figure 5:
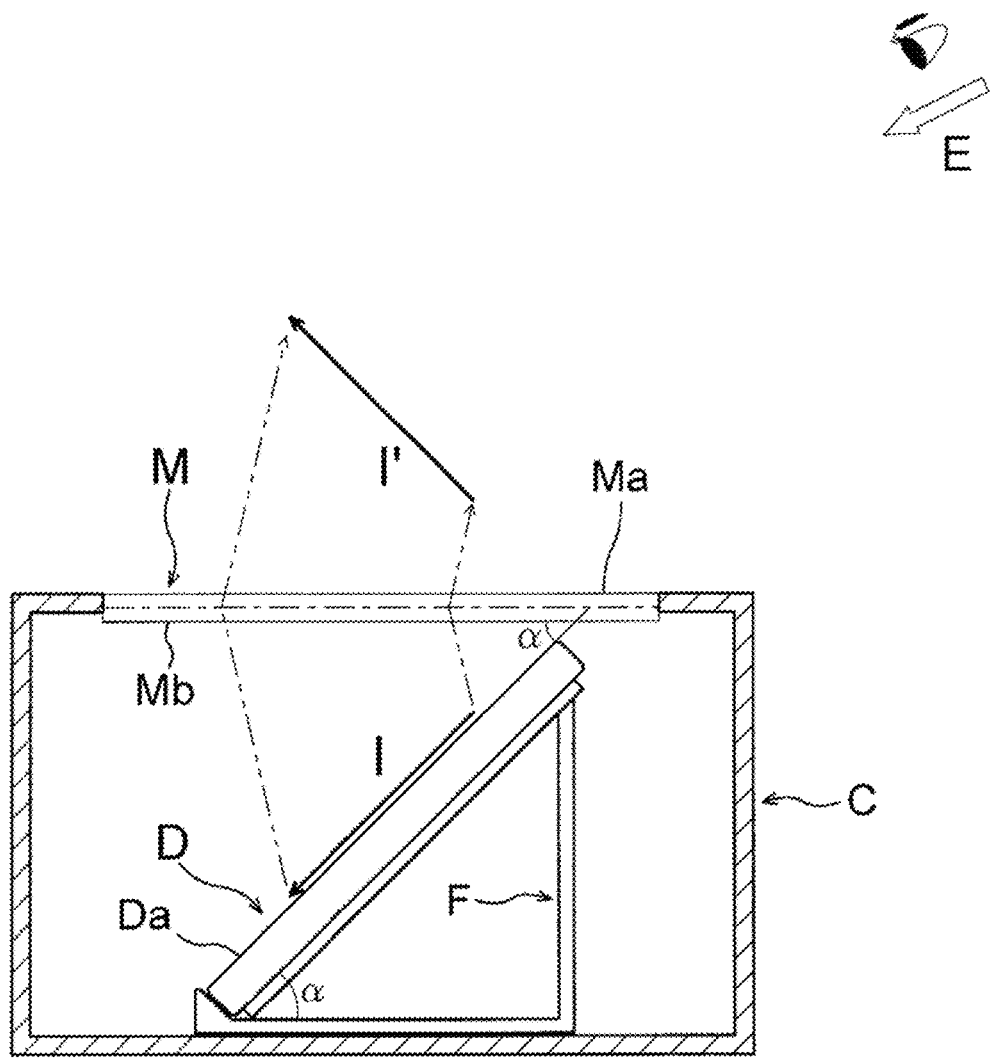
FIG. 5 is a sectional view showing a configuration of a conventional display device.

With this configuration, the micromirror array M is capable of image-forming the video picture I lying on one surface side of the array M as the erect spatial image I' in a position symmetrical to the video picture I on the other surface side, as shown in FIG. 2 (and FIG. 5).

The micromirror array may be configured in such a manner that the substrates 10 and 10' are vertically stacked together while the front surface 10a where the linear grooves are formed and a back surface 10'b where no linear grooves are formed are brought into abutment with each other or in such a manner that the substrates 10 and 10' are stacked together while back surfaces (10b and 10'b) where no linear grooves are formed are brought into abutment with each other, in addition to the manner in which the substrates 10 and 10' are stacked together while the front surfaces of the respective optical elements where the linear grooves are formed are brought into abutment with each other (the aforementioned array M). This also provides the image-forming optical element having the same function.

Further, the image-forming optical element (micromirror array) used herein may be configured such that parallel linear grooves (with a phase difference of 90 degrees between the directions of the grooves in the front surface 10a and the back surface 10b) are formed in the upper front surface 10a and the lower back surface 10b of a single substrate 10 (optical element) by dicing using the aforementioned rotary blade and the like.

Any one of the micromirror arrays formed in the aforementioned manners may be used as the image-forming optical element for use in the exhibition device according to the present embodiment. In particular, the micromirror array M shown in FIG. 4B is most preferably used from the viewpoint of preventing dust and the like from being deposited in the grooves of the array M.

The video picture exhibition using the aforementioned exhibition device is as follows. First, the display portion B with the exhibiting objects (objects O: $O_1$, $O_2$, $O_3$ and the like) disposed on its upper surface (upper surface of the housing H around the opening 1a) is positioned and placed in a predetermined position on the exhibition surface (upper surface) of the exhibition table S. While a video picture is projected from the projector P, the vertical position (upward and downward movement) of the projector P is changed. Thus, the vertical position, light axis (projection angle) and projection range of the projector P are adjusted so that the projected video picture (light beam indicated by the dash-double-dot lines) is approximately equal in size to the upper surface of the display portion B (upper surface of the circular housing H shown in FIG. 3).

Next, a start signal from any one of the video picture synchronizers provided in the display D and the projector P is transmitted to thereby start a display (space projection) program for the spatial image I' by means of the display portion B (display D) and a projection program for a video picture from above by means of the projector P in operative association with each other at the same time. This causes switching of the display of the spatial image I' and the video picture projected from above by means of the projector P at the same moment in synchronism with each other, so that the spatial image I' and the projected video picture are exhibited to a person (a viewer, a customer and the like) standing in front of the display portion B by the use of more impressive and more effective renditions. For example, in the display portion B shown in FIG. 3, a color moving picture or the like representing the changes of the four seasons such as mountains, rivers, forests, woods and flowering plants is projected onto the upper surface of the housing H around the opening 1a and on the surfaces of the objects O whereas a moving picture of animals, persons, merchandise and company logos or the like is displayed (reproduced) as the spatial image I' positioned in the center of the color moving picture. In this case, the impression of the centrally positioned spatial image I' itself and the motion thereof are more accentuated.

Also, the projector P is set so as to be able to project (projection mapping) a video picture corresponding to the three-dimensional shape of the exhibiting objects on the surfaces of the exhibiting objects in an optimum position at an optimum moment. Thus, large binocular parallax is caused between the exhibiting objects on which the video picture is projected and the spatial image I', so that the spatial image I' is made as a video picture which provides a stronger sense of depth and a stronger sense of realism than those produced by the conventional display devices and which gives stronger impact to the viewer.

The communication (synchronization) between the video picture synchronizers of the display D and the projector P may be either wired communication using cables, fibers and the like or wireless communication using Bluetooth (registered trademark), NFC, wireless LAN and the like. Also, the synchronization between the video pictures may be achieved under manual operation. For example, an attendant (operator) may push switches prepared in the two devices at the same time or push a start button of one of the devices at an appropriate moment while viewing the video picture displayed on the other device.

Although specific forms in the present invention have been described in the aforementioned example, the aforementioned example should be considered as merely illustrative and not restrictive. It is contemplated that various modifications evident to those skilled in the art could be made without departing from the scope of the present invention.

The exhibition device and the video picture exhibition method using the same according to the present invention are capable of exhibiting both the spatial image displayed on the display portion and the exhibiting objects disposed around the spatial image by the use of impressive and effective renditions which especially cause a viewer to feel a sense of depth and a sense of realism. Thus, the exhibition device and the video picture exhibition method using the same according to the present invention are suitable for a method for utilization in which exhibition or the like is performed in large space, such as advertisements and exhibition in storefronts, shows and the like and commercial use in presentations and the like.

REFERENCE SIGNS LIST

B Display portion
D Display
I' Spatial image
M Micromirror array
P Projector

The invention claimed is:

1. An exhibition device comprising:
   a display portion configured to image-form a first video picture in space, and
   a projection portion configured to project a second video picture onto an object,
   wherein the display portion includes a display, an image-forming optical element, and an enclosure configured to house the display and the image-forming optical element, the image-forming optical element being disposed in a light transmissive fashion in an upper surface of the enclosure,
   wherein the display portion is configured to image-form the first video picture displayed on a display surface of the display disposed in an attitude inclined at a predetermined angle under the image-forming optical element as a spatial two-dimensional video picture standing up obliquely in a spatial position lying over the upper surface of the enclosure through the image-forming optical element;
   wherein the display portion is positioned in a predetermined position,
   wherein the projection portion is disposed in a position lying over the upper surface of the enclosure of the display portion, and is positioned so as to be able to project the second video picture onto a region of the upper surface of the enclosure around the spatial two-dimensional video picture image-formed by the display portion,
   wherein the image-forming optical element of the display portion is disposed in an opening provided in the upper surface of the enclosure, and
   wherein an exhibiting object having a predetermined three-dimensional shape is disposed in a region of the upper surface of the enclosure around the opening.

2. The exhibition device according to claim 1, wherein at least one of the display portion and the projection portion includes a video picture synchronizer configured to control the display of the spatial two-dimensional video picture by the display portion and the projection of the second video picture onto the upper surface of the enclosure by the projection portion in operative association with each other.

3. The exhibition device according to claim 1, wherein the display is a display portion of a cellular mobile phone or a personal digital assistant.

4. A method of exhibiting a video picture using an exhibition device, the method comprising:
   image-forming a first video picture in space using a display portion, and
   projecting a second video picture onto an object using a projection portion, the second video picture being different from the first video picture,
   wherein the display portion includes a display, an image-forming optical element, and an enclosure configured to house the display and the image-forming optical element, the image-forming optical element being disposed in a light-transmissive fashion in an upper surface of the enclosure,
   wherein the display portion is configured to image-form the first video picture displayed on a display surface of the display disposed in an attitude inclined at a predetermined angle under the image-forming optical element as a spatial two-dimensional video picture standing up obliquely in a spatial position lying over the upper surface of the enclosure through the image-forming optical element;
   wherein the projection portion is disposed in a position lying over the display portion and the second video picture is projected toward the upper surface of the enclosure of the display portion positioned in a predetermined position,
   wherein the image-forming optical element of the display portion is disposed in an opening provided in the upper surface of the enclosure,
   wherein an exhibiting object having a predetermined three-dimensional shape is disposed in a region of the upper surface of the enclosure around the opening, and
   wherein the projection portion projects the second video picture corresponding to the three-dimensional shape onto a surface of the exhibiting object.

5. The method of exhibiting a video picture according to claim 4, wherein the display of the spatial two-dimensional video picture by the display portion and the projection of the second video picture onto the upper surface of the enclosure by the projection portion are performed in synchronism with each other.

6. The method of exhibiting a video picture according to claim 4, wherein a display portion of a cellular mobile phone or a personal digital assistant is used as the display.

* * * * *